(12) United States Patent
Ayala et al.

(10) Patent No.: US 7,901,646 B2
(45) Date of Patent: Mar. 8, 2011

(54) SYSTEM AND METHOD FOR SULFUR RECOVERY

(75) Inventors: Raul Eduardo Ayala, Houston, TX (US); Harish Radhakrishna Acharya, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/535,740

(22) Filed: Aug. 5, 2009

(65) Prior Publication Data

US 2011/0033370 A1 Feb. 10, 2011

(51) Int. Cl.
*B01D 53/48* (2006.01)
*B01D 53/74* (2006.01)
*C01B 17/02* (2006.01)

(52) U.S. Cl. ............ 423/220; 423/230; 423/242.1; 423/244.01; 423/567.1; 423/573.1; 423/577; 422/129; 422/168; 422/187; 422/188

(58) Field of Classification Search .......... 423/220, 423/230, 242.1, 244.01, 567.1, 573.1, 577; 422/129, 168, 187, 188
See application file for complete search history.

(56) References Cited

U.S. PATENT DOCUMENTS

| | | | |
|---|---|---|---|
| 3,904,387 A * | 9/1975 | Kertamus et al. | ............... 48/210 |
| 4,857,285 A | 8/1989 | Gal | |
| 5,152,970 A | 10/1992 | Van der Wal et al. | |
| 5,271,907 A | 12/1993 | Copeland | |
| 5,401,475 A | 3/1995 | Ayala et al. | |
| 5,407,466 A | 4/1995 | Lokhandwala et al. | |
| 6,531,053 B2 | 3/2003 | Khare | |
| 2006/0188737 A1 | 8/2006 | Roa et al. | |

OTHER PUBLICATIONS

H.J. Sloot, C.A. Smolders, W P M. Van Swaaq and G.F. Versteeg; Surface diffusion of hydrogen sulfide and sulfur dioxide in alumina membranes in the continuum regime; Journal of Membrane Science, 14 (1992) 263-278.

Kaaeid A. Lokhandwala, Matt Ringer, Hans Wijmans, Richard W. Baker; Low-Quality Natural Gas Sulfur Removal/Recovery System; Membrane Technology and Research, Inc., Conference Title: Fuels Technology Contractors Review Meeting, Conference Location: Morgantown, West Virginia, Conference Dates: Nov. 16-18, 1993; 7 Pages.

K. A. Lokhandwala, K. A. Amo, R. W. Baker, I. Pinnau, L. Toy and J. G. Wijmans; Low-Quality Natural Gas Sulfur Removal/Recovery With Membranes; Membrane Technology and Research, Inc.; Proceedings of the Natural Gas Conference Emerging Technologies for the Natural Gas Industry DOE FETC, 1997; 13 Pages.

U. Balachandran, T. H. Lee, and S. E. Dorris; Development of Mixed-Conducting Ceramic Membrane for Hydrogen Separation; Aug. 1999; Energy Technology Divisiow Argonne National Laboratory, Argonnne, IL 60439; Invited paper submitted for presentation at Sixth Annual International Pittsburgh Coal Cotierence, Pittsburgh, PA, Oct. 11-15,1999.; 14 Pages.

(Continued)

*Primary Examiner* — Timothy C Vanoy
(74) *Attorney, Agent, or Firm* — Paul J. DiConza

(57) ABSTRACT

Disclosed herein are various types of systems and methods for the efficient production of sulfur from a sulfur-laden gas. The system described herein includes a desulfurization unit, a regenerator receiving sulfurized mass from the desulfurization unit, a sulfur recovery unit, a sulfur track in fluid communication with the regenerator and the sulfur recovery unit, and a sulfur concentrator on a sulfur track. The sulfur stream coming out of the regenerator is concentrated using the sulfur concentrator and converted into a sulfur product at the sulfur recovery unit.

23 Claims, 4 Drawing Sheets

OTHER PUBLICATIONS

Nii S, Takeuchi H; Abstract : Removal of CO2 and or SO2 From Gas Streams by a Membrane Absorption Method; Gas Separation & Purification, vol. 8, No. 2, 1994; 1 Page.

Ying-Ying Jiang, Zheng Zhou, Zhen Jiao, Lei Li, You-Ting Wu, and Zhi-Bing Zhang; Abstract : SO2 Gas Separation Using Supported Ionic Liquid Membranes; J. Phys. Chem. B, 2007, 111 (19); Publication Date (Web): Apr. 19, 2007; 2 Pages.

Mulder, Basic Principles of Membrane Technology, Center for Membrane Science and Technology, University of Twente, Enschede, The Netherlands, J. Am. Chem. Soc., Kluwer Academic Publisher, vol. 119, No. 36, pp. 396 & 397, 1997.

Portzer et al., "Durability Testing of the Direct Sulfer Recovery Process", Research sponsored by the U.S. Department of Energy's Morgantown Energy Technology Center, under contract DE-AC21-93MC30010, with Research Triangle Institute, 9 Pages, Dec. 31, 1996.

\* cited by examiner

SYSTEM AND METHOD FOR SULFUR RECOVERY

BACKGROUND

The invention relates generally to a system and process for sulfur recovery and particularly to a system and process for sulfur recovery from a sulfur-laden gaseous stream.

Coal derived synthesis gas ("syngas") or other feedstocks such as biogas, waste gas, and blast furnace gas can be used effectively for the applications such as power generation and chemicals production. In an integrated gasification/combined cycle (IGCC) process, coal is gasified with air (or oxygen) and steam to produce a combustible gas (coal gas) comprising principally carbon monoxide, carbon dioxide, hydrogen, methane, water vapor and nitrogen (when air is used as the oxidant). The gases serve as fuel to a gas turbine or a gas turbine-steam turbine combined cycle to generate electrical power. The product of the IGCC process can also contain minor amounts of other gaseous species. Other feedstock such as biogas, waste gas, and blast furnace gas can produce different gaseous compositions than the coal gases. However, the coal gas or other feedstocks as described above are generally purified to remove species such as particulate matter, alkali metals, and sulfur compounds before being considered for the intended end use. The sulfur compounds in such gases include hydrogen sulfide ($H_2S$) and, in lesser amounts, carbonyl sulfide (COS), carbonyl disulfide ($CS_2$) and the like, depending on the sulfur content of the feedstock from which the gas is derived and derivation process used. In order to meet environmental standards and to prevent damage to equipment further using the combustible gas or other feedstocks, it may be necessary to remove some or all of the sulfur compounds and other contaminants from the gases.

One process of removing sulfur compounds from a sulfur-laden gas stream includes desulfurization through the contact of sulfur compounds with a sorbent, such as a metal oxide for example, to form metal sulfides, also referred to herein as sulfurized mass. The net sulfur sorption reaction is given by an example as in the equation (1) below:

$$H_2S+MO \rightarrow MS+H_2O \qquad (1)$$

wherein M is the metal present in the sorbent; MO represents the metal oxide; and MS represents the metal sulfide. For the sake of simplicity, M is represented as divalent, but it will be apparent that metals in other valence states may also be employed. Also, since the actual proportion of sulfur in the metal sulfide usually varies from theory, these equations may not accurately represent the stoichiometry of the reactions.

Following the desulfurization, the sorbent is regenerated in a regenerator to recover metal oxide. The standard approach to the regeneration of this sorbent is by the desorption of absorbed, adsorbed, or reacted sulfur or sulfur compounds by oxidation or roasting, to yield the metal oxide and sulfur containing gas. Oxidation can be facilitated by supplying regeneration gas to the sulfurized mass to regenerate the metal oxide. The regeneration reaction may be represented by the following equation (2):

$$2MS+3O_2 \rightarrow 2MO+2SO_2 \qquad (2)$$

wherein M, MS and MO are as defined above. It is apparent that during this regeneration, gaseous forms of sulfur or sulfur-containing species will be evolved along with other gases, and must be controlled to avoid additional pollution problems.

Depending on the regeneration method employed, gaseous sulfur species can be in the form of oxides of sulfur, carbonyl sulfide and carbonyl disulfide among others. Furthermore, some sulfurized mass can be regenerated to produce gaseous sulfur species in the reduced form such as hydrogen sulfide, when contacted with regenerator gases other than oxygen or air. For instance, tin sulfide (SnS), when contacted with steam, is regenerated to stannic oxide with the evolution of hydrogen sulfide and hydrogen gases.

The concentration of gaseous sulfur species in the sulfur-containing gas stream of the regenerator is ordinarily low, typically less than about 10%. It is advantageous to have the gaseous sulfur contents in the sulfur-containing gas stream as high as possible for effective production or recovery of saleable forms of sulfur from the sulfur containing gas stream before releasing it as the tail gas to the atmosphere. The present invention provides a system and method for efficiently recovering sulfur from the sulfur stream of the regenerator.

BRIEF DESCRIPTION

One embodiment of the present invention is a system for sulfur recovery. The system includes a desulfurization unit, a regenerator for receiving sulfurized mass from the desulfurization unit, a sulfur recovery unit, a sulfur track in fluid communication with the regenerator and the sulfur recovery unit, and a sulfur concentrator on a sulfur track.

Another embodiment of the present invention is a system for sulfur recovery. The system includes a desulfurization unit configured to receive a sulfur-laden gas stream and form sulfurized mass, a regenerator receiving sulfurized mass from the desulfurization unit, a sulfur recovery unit, a sulfur track for transporting oxidized sulfur gas from the regenerator to the sulfur recovery unit, a sulfur oxide concentrating membrane on the sulfur track, a slip-stream fuel track in fluid communication with the desulfurization unit and the sulfur recovery unit, and a hydrogen concentrating membrane, disposed on the slip-stream fuel track. The sulfur oxide concentrating membrane comprises a first part to collect concentrated sulfur oxide and a second part to collect residual gas of the sulfur concentrating membrane. The hydrogen concentrating membrane comprises a first part to collect concentrated hydrogen and a second part to collect residual gas of the hydrogen concentrating membrane. The system further includes a sweep steam track connected to the first part of the sulfur oxide concentrating membrane and first part of the hydrogen concentrating membrane. The sulfur recovery unit is in fluid communication with the first part of the sulfur oxide concentrating membrane and the first part of the hydrogen concentrating membrane.

Yet another embodiment of the present invention is a system for sulfur recovery. The system includes a desulfurization unit configured to receive a sulfur-laden gas stream and form sulfurized mass, a regenerator to receive sulfurized mass from the desulfurization unit, a sulfur recovery unit, a sulfur track for transporting reduced sulfur gas from the regenerator to the sulfur recovery unit, a hydrogen sulfide concentrating membrane on the sulfur track, comprising a first part to collect concentrated hydrogen sulfide and a second part to collect residual gas from the hydrogen sulfide concentrating membrane; a first slip-stream sulfur track transporting reduced sulfur gas from the sulfur track to a hydrogen concentrating membrane comprising a first part to collect concentrated hydrogen and a second part to collect residual gas of the hydrogen concentrating membrane; an oxidizer on a second slip-stream of the sulfur track in fluid communication with the first part of the hydrogen sulfide concentrating membrane and in fluid communication with the sulfur recovery unit; and a sweep steam track connected to the first part of the hydrogen sulfide concentrating membrane and first part of the hydrogen concentrating membrane. The sulfur recovery unit is in fluid communication with the oxidizer on the sulfur track.

Another embodiment of the present invention is a process for sulfur recovery. The process includes the steps of removing sulfur compounds from a sulfur-laden gas stream using a sorbent in a desulfurization unit to form a sulfurized mass, desorbing gas from the sulfurized mass in a regenerator to form a sulfur stream, concentrating sulfur content of the sulfur stream using a sulfur concentrator to form a concentrated sulfur stream; and converting the concentrated sulfur stream to form a sulfur product in a sulfur recovery unit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In the following specification and the claims that follow, the singular forms "a", "an" and "the" include plural referents unless the context clearly dictates otherwise. The term "sulfur" as used in the specification refers to elemental sulfur, sulfur compounds or combination thereof, unless explicit mention of elemental sulfur is provided.

Various embodiments of the present invention describe a system and process for recovering sulfur from a sulfur stream desorbed from a sulfurized mass in a regenerator. The sulfur may be recovered as elemental sulfur or any compounds of sulfur such as sulfuric acid, ammonium sulfate, or organosulfur compounds.

Figure 1:
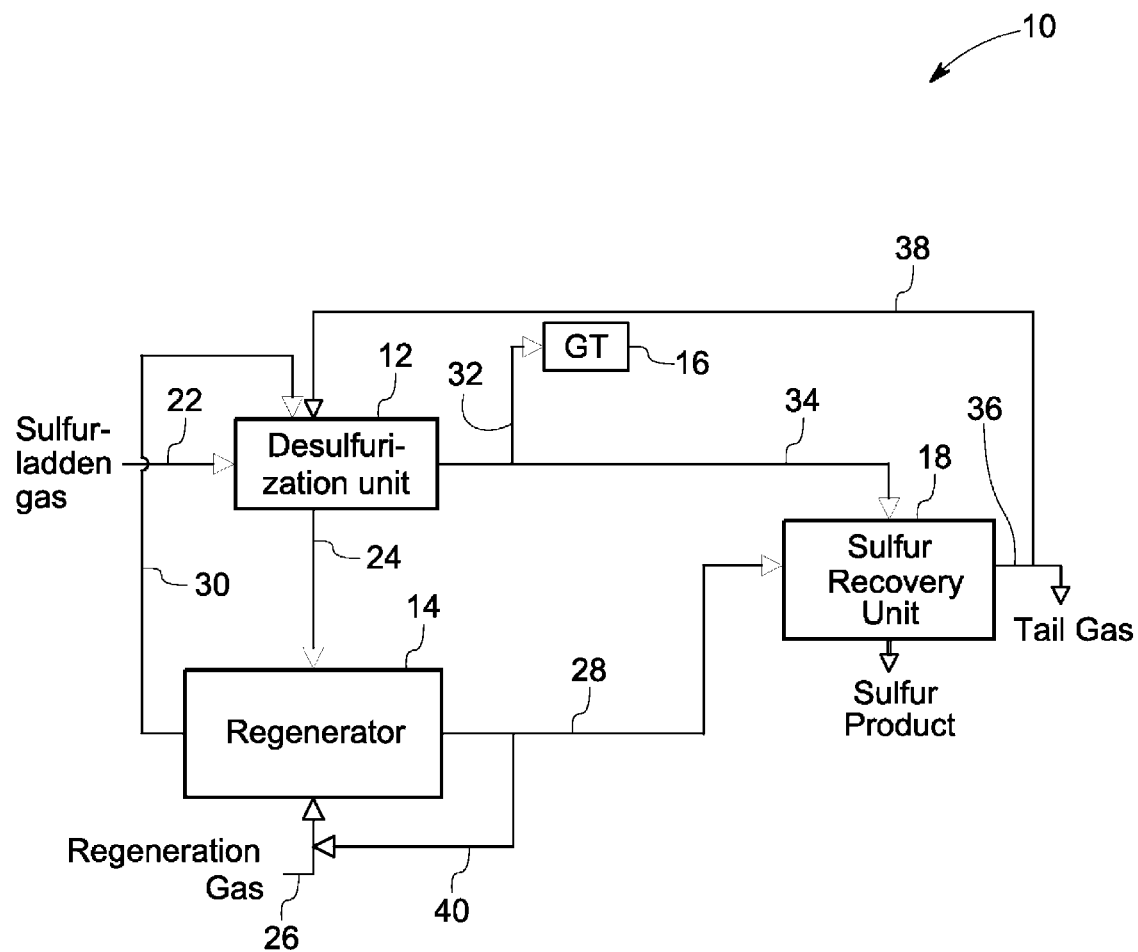
FIG. 1 is a schematic representation of a prior art system for sulfur recovery.

FIG. 1 is a diagrammatical view of a prior art sulfur recovery system 10. The system 10 includes a desulfurization unit 12, a regenerator 14, and a sulfur recovery unit 18. During operation, a sulfur-laden gas stream from a gasifier enters the desulfurization unit 12 through a sulfur-laden gas track 22 and contacts a sorbent in the desulfurization unit 12. A sorbent as used herein can be in the solid form or in the liquid form unless otherwise specifically mentioned. A track as used herein is a conduit allowing fluid communication between various elements connected by the conduit and used as a means for passage of the gases or sorbents during operation.

The sorbent in the desulfurization unit 12 absorbs sulfur from the sulfur-laden gas and becomes a sulfurized mass during operation. Absorption as used herein can mean a simple absorption of the sulfur, reaction of the sorbent with the sulfur, or even an adsorption of sulfur. The sulfurized mass is transported to the regenerator 14 through a sulfurized mass track 24 and contacts a regeneration gas supplied through a regenerator gas track 26. During the reaction between the sulfurized mass and the regeneration gas in the regenerator 14, the sorbent desorbs the sulfur containing gas to form a sulfur stream in the sulfur track 28 connected to the regenerator 14. The "desorption" herein can mean a simple desorption or forming any sulfur containing gas through a chemical reaction with the regeneration gas. The regenerated sorbent gets transported from the regenerator 14 to the desulfurization unit 12 through a sorbent track 30 to be reused to absorb sulfur from the sulfur-laden gas stream.

The sulfur-laden gas, after reacting with the sorbents, gets depleted of sulfur, and becomes a desulfurized gas (fuel gas) and can be used as a feed gas of further utility, such as for an energy source such as a gas turbine (GT) 16, for example, or for chemicals or steam production. The fuel gas is flowed to the GT through a fuel track 32. A slip-stream of the fuel gas is sourced from the fuel track 32 through a slip-stream fuel track 34 and connects to the sulfur recovery unit 18. The sulfur stream in the sulfur track 28 contacts and reacts with fuel gas of the slip-stream fuel track 34 at the sulfur recovery unit 18 to produce elemental sulfur and tail gas collected through a tail gas track 36. A "sulfur stream" herein means a stream of desorbed gas comprising sulfur, sourced from the regenerator. A slip-stream sourced from the tail gas can flow back to the desulfurization unit 12 through a slip-stream tail gas track 38 for further reduction of sulfur, if required to reduce sulfur emissions to the atmosphere through the tail gas.

The tail gas emissions allowable for any plant site depend on the flow rate and sulfur concentration in the tail gas. It is desirable to have low amounts of both the flow rate and concentrations of sulfur. The efficiency of sulfur removal in the sulfur recovery unit 18 can be enhanced if the sulfur stream is enriched in the sulfur. This may be accomplished, for example, by recycling a portion of the sulfur stream back to the regenerator 14 through a slip-stream sulfur track 40 of the sulfur track 28 so that the net sulfur content in the sulfur stream flowing through the sulfur track 28 exiting the regenerator is increased.

However, recycling the sulfur stream back into the regenerator 14 forces the regenerator 14 to operate at higher net sulfur stream content. This may adversely affect operation of the regenerator 14 and limit the extent of regeneration of the sorbent, and thus increase the sulfur content of the regenerated sorbent in sorbent track 30, which in turn may adversely affect the efficiency of sulfur removal in the desulfurization unit 12. In certain events, operating the regenerator with higher net sulfur content may entail risks. For example, in the event of having oxidized sulfur in the sulfur stream, there is a greater risk of formation of metal sulfates in the sorbent material through the reaction represented by equation (3):

$$MO+SO_2+1/2O_2 \rightarrow MSO_4. \tag{3}$$

The sulfates formed here are known to reduce the desulfurization capacity of the sorbent in the desulfurization unit 12, thus reducing the sorbent lifetime and require more frequent replacement of the sorbent, which could increase the operating cost. Therefore, a more efficient method of sulfur recovery is required to treat the sulfur stream coming out from the regenerator 14.

Figure 2:
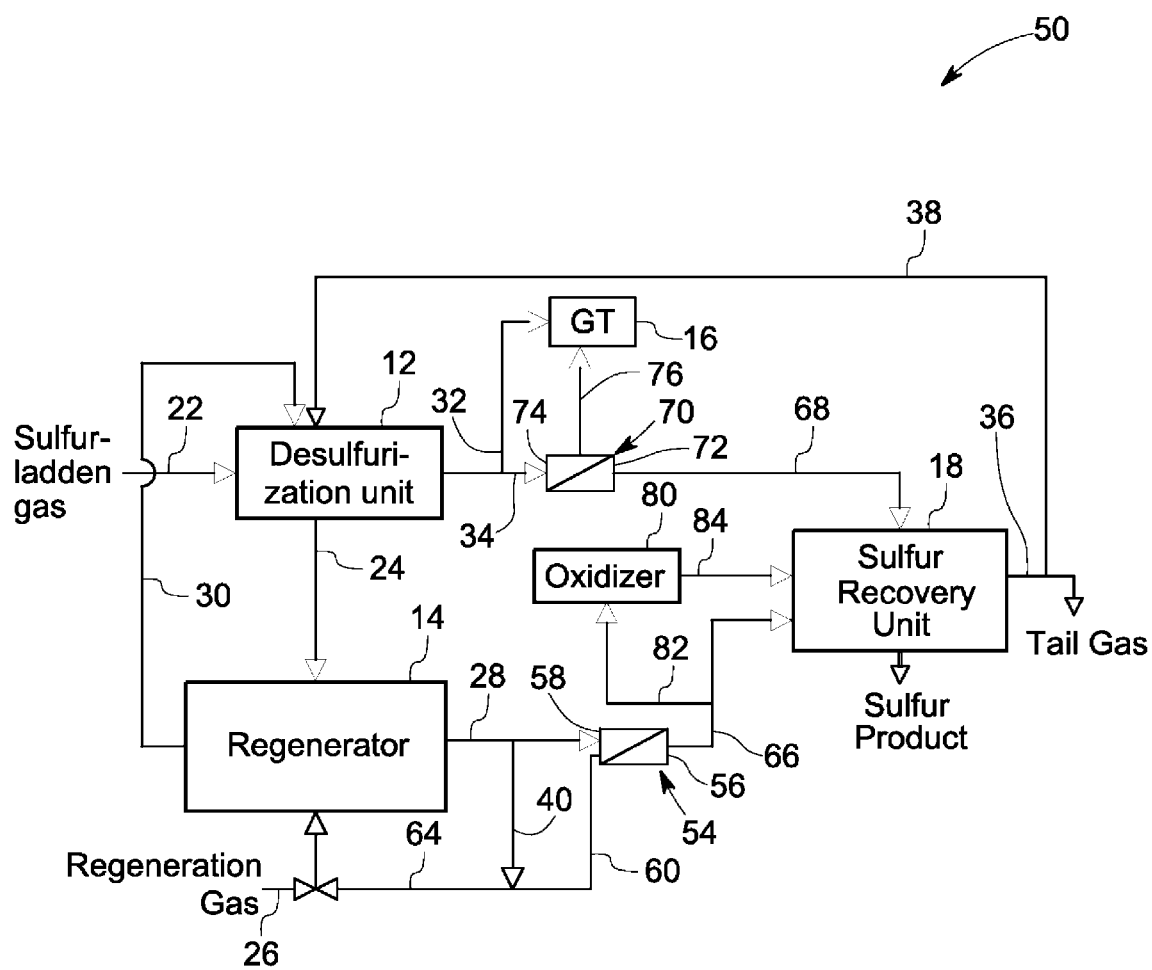
FIG. 2 is a schematic representation of a system for sulfur recovery in accordance with one embodiment of the invention.

FIG. 2 illustrates a schematic diagram of a sulfur recovery system 50 including a sulfur concentrator 54 according to one embodiment of the present invention. The sulfur concentrator 54 can be any concentrator for the gaseous forms of sulfur compounds. Examples of the concentrator methods include selective permeation through membranes, temperature swing absorption, and/or pressure swing absorption. The sulfur concentrator 54 and reducing gas concentrator 70 ensure proper integrated operation between the desulfurization unit 12, regenerator 14, and sulfur recovery unit 18 (and/or the elemental sulfur recovery unit 108 as will be discussed below in context of FIG. 4) by adjusting the concentration and physical state properties of any of the streams that eventually enter the sulfur recovery unit 18.

The sulfur concentrator 54 is advantageously disposed along a sulfur track 28 in fluid communication with a regenerator 14 and a sulfur recovery unit 18, and produces a sulfur-rich stream in the sulfur rich track 66 by taking an input from the sulfur stream. This configuration of the sulfur recovery system 50, wherein the sulfur concentrator 54 operates in conjunction with a regenerator 14 and a sulfur recovery unit 18, at least in part, leads, for example in the case of the oxidized sulfur, to more efficient sulfur recovery than in prior art systems, such as the system shown in FIG. 1, without leading to the metal sulfate formation in the sorbent material. In addition, by having a sulfur-rich stream, sulfur recovery unit 18 can be made more efficient and compact, thus reducing capital and operating cost of a sulfur recovery plant. The system 50 may provide flexibility during plant operation by controlling the net separations of the sulfurized mass effected in the regeneration unit and the net sulfur removal in the sulfur concentrator 54 to modulate the gaseous sulfur content concentration in the sulfur track 28, thus forming a sulfur-rich stream for efficient operation of the sulfur recovery unit 18 in removing sulfur from the tail gas emissions.

According to one embodiment of the present invention, during operation of the sulfur recovery system 50, a sulfur-laden gas such as coal gas, synthesis gas (syngas), biomass fuel, or any other hydrocarbon-based gas entering a desulfurization unit 12 through the sulfur-laden gas track 22 gets desulfurized by means of a desulfurizing mass (sorbent). In one particular embodiment, the sulfur-laden gas is a syngas sourced from a gaseous output of a gasification system.

As described in the earlier paragraphs, the desulfurization mass or sorbent can be a solid or liquid sorbent that absorbs the sulfur content of the sulfur-laden gas in the desulfurization unit 12. Materials of the sorbent can include transition metals, such as copper, zinc, iron, nickel, chromium, vanadium, tungsten or mixtures thereof and alkaline earth metals such as magnesium, strontium, calcium and barium. Metal oxides such as iron oxide, zinc oxide, zinc ferrite, copper ferrite, copper oxide, vanadium oxide and mixtures thereof can also be used as sorbents for sulfur. Zinc titanate is another material used as a solid sorbent in one embodiment. Tin oxide is used as a solid sorbent in another embodiment. Sorbents of the liquid form can include aqueous solutions of glycols and amines as well as alcohols, and organics.

In one embodiment, the sorbent used in the process and the system of the present invention is one, which is capable of removing the sulfur from hot sulfur-laden gases, and accordingly, the sorbent is capable of withstanding the temperatures of the hot gases. The temperatures of operation can range across the sulfur recovery system 50 from near room temperature to up to 800° C. depending on location, the absorbing mass used, and the type of feed streams. In certain instances, when the sulfur-laden gas is a hot coal gas, the hot coal gas can have a temperature of at least about 400° C. Therefore, the sulfur concentrator 54 operable at different temperature ranges can be designed and used. In one embodiment, the sulfur concentrator 54 is operable at the temperature ranges of about 20° C. to about 200° C. In another embodiment, the sulfur concentrator 54 is designed to be operable even at a temperature greater than 200° C. In another embodiment, the sulfur concentrator 54 can be efficiently operated at a temperature greater than 400° C. and less than about 700° C. In one embodiment, the pressure in the sulfur recovery system 50 can be from near atmospheric up to 60 bars.

The sulfurized mass leaving the desulfurization unit is transferred to a regenerator 14 though a sulfurized mass track 24 and is subject to regeneration by contacting the sulfurized mass with air, oxygen, oxygen enriched air, steam, or an inert carrier gas supplied through a regenerator gas track 26 to form a regenerated sorbent. The regenerated sorbent can flow back to the desulfurization unit 12 through the sorbent track 30. The sulfur compounds desorbed from the sulfurized mass, in one embodiment, get converted into oxides of sulfur in the presence of oxygen-containing regeneration gas and generate an oxidized sulfur stream entering the sulfur track 28. In this embodiment, the sulfur stream mainly comprises sulfur oxides such as sulfur dioxide ($SO_2$) and sulfur trioxide ($SO_3$), when the regenerator gas is oxygen rich. If, according to another embodiment, the regenerator gas is an inert carrier gas, or steam, the chance of having a reduced sulfur stream comprising hydrogen sulfide ($H_2S$) in the sulfur track 28 is high. The sulfur concentrator 54 is capable of concentrating sulfur containing gas of the sulfur stream at a first part 56 of the sulfur concentrator 54, making the sulfur stream in to a sulfur-rich stream and releasing it to a sulfur-rich track 66, leaving behind residual gas from the sulfur stream, containing gases other than sulfur, in a second part 58 of the sulfur concentrator 54.

A sulfur concentrator can work on the principle of either concentrating or separating the sulfur species from the sulfur stream. For example, in one embodiment, the sulfur concentrator can include secondary selective sorbents to absorb the sulfur species in the sulfur stream and regenerate it by desorption. In another embodiment, the sulfur concentrator 54 is a sulfur concentrating membrane. In this embodiment, the first part 56 of the sulfur concentrator 54 forms the permeate side and the second part 58 forms the retentate side. In one embodiment, the sulfur concentrator is a membrane capable of selectively passing sulfur oxides while retaining other gas components. In another embodiment, the sulfur concentrator is a membrane capable of selectively passing hydrogen sulfide. The concentrator membranes work on the selective gas separation principle of membranes. The membranes can be porous or non-porous depending on the gas to be separated and the materials used for the membranes. One way of gas separation by porous membranes is through Knudsen diffusion. Porous and non-porous membranes can also work by the reactive or non-reactive diffusion through the material of the membranes. Gas separation by dense, non-porous membranes can be by perm-selective solution-diffusion or facilitated transport processes, for instance.

The residual gas of the sulfur concentrator, concentrated on the second part 58 of the sulfur concentrator 54, can be taken out using a sulfur residual track 60. In one embodiment, the residual gas of the sulfur concentrator is typically leaner in the sulfur and richer in regeneration gas components other than sulfur, for example oxygen, compared to the sulfur stream of the sulfur track 28 and hence can be transported back to the sulfur stream in the sulfur track 28 through a residual track 60, combining with the slip-stream sulfur track 40 to form a feed back track 64 to the regenerator so as to enable better oxidation and regeneration of the desulfurization mass in the regenerator. The slip-stream sulfur track 40 of the present system 50 is a by-pass of the sulfur-concentrator for the sulfur stream that can be used to control the effective $SO_2$ content in a recycled regenerator gas, for example at the start-up stage of the system 50.

In one embodiment, the sulfur rich stream passing through the sulfur rich track 66 enters the sulfur recovery unit 18 to form a sulfur product. For example, a sulfur containing gas of sulfur rich track 66 can combine with oxygen or air and/or water in the sulfur recovery unit 18 to form sulfuric acid as represented by the reactions of equation (4) and equation (5):

$$SO_2 + 1/2 O_2 \rightarrow SO_3 \quad (4)$$

$$SO_3 + H_2O \rightarrow H_2SO_4. \quad (5)$$

In another embodiment, the sulfur-rich stream passing through the sulfur-rich track 66 contacts reducing gas coming from a reducing gas track 68 at the sulfur production unit 18. The reaction between the sulfur-rich stream and the reducing gas stream produces a sulfur product in the sulfur recovery unit 18. The reducing gas can be sourced from any reducing gas repository. In one embodiment, the reducing gas is sourced from the fuel gas coming out of the desulfurization unit 12 through a slip-stream track 34 (referred to henceforth as slip-stream fuel track 34) from a fuel track 32 to the reducing gas track 68. For example, a sulfur containing gas of sulfur rich track 66 can combine with the reducing gas such as $H_2$ or CO coming from the slip-stream fuel track 34 through the reducing gas track 68 in the sulfur recovery unit 18 to form elemental sulfur as per the equation (6) below:

$$SO_2 + 2H_2 \rightarrow 2H_2O + S \quad (6)$$

In one embodiment, a reducing gas concentrator (also called a reductant concentrator) 70 can be used to separate the reducing gas from the fuel gas and thereby concentrate the reducing gas, which can then react with the sulfur-rich stream in the sulfur recovery unit 18. The reductant concentrator 70 comprises two parts: a first part 72 collecting concentrated reducing gas, and a second part 74 collecting residual gas from the fuel gas after depletion of the reducing gas that can be fed into the gas turbine 16, for example, through a fuel feed back track 76. Therefore, in another embodiment, the reducing gas is concentrated through a reductant concentrator 70 and the concentrated reducing gas flows through the reducing gas track 68 and gets reacted with the sulfur-rich stream in the sulfur recovery unit 18 to form the sulfur product. In this manner, the amount of valuable fuel stream diverted from the gas turbine 16 through the slip-stream fuel track 34 is minimized, thus retaining a high gas flow and power output by the gas turbine 16. The sulfur product formed primarily comprises elemental sulfur in this case.

Similar to the sulfur concentrator 54, the reductant concentrator 70 can also be designed to be operable at different temperature ranges. In one embodiment, the reductant concentrator 70 is operable at the temperature ranges of about 20° C. to about 200° C. In another embodiment, the reductant concentrator 70 is designed to be efficiently operable even at a temperature greater than 200° C. In another embodiment, the reductant concentrator 70 can be efficiently operated at a temperature greater than 400° C. and less than about 700° C.

In one embodiment, the reductant concentrator 70 is a hydrogen concentrator and in a further embodiment, the reductant concentrator 70 comprises a membrane. Depending on the type of reducing gas preferred for reducing the sulfur-rich stream, a combination of membranes can be employed in the reductant concentrator 70. For example, a hydrogen ($H_2$) concentrator can employ a membrane (henceforth called as hydrogen membrane) capable of passing hydrogen and thereby filtering out non-hydrogen gases in the fuel gas and allowing the passage of hydrogen thereby forming a $H_2$ rich reducing gas stream. A reducing gas membrane, such as hydrogen membrane can be of any material such as a metal, ceramic, polymeric, or composite membranes. While generally polymeric membranes may not be able to operate for a long enough time to concentrate hot reducing gases coming out of the desulfurization unit 12, the hydrogen membranes of the other materials, such as, for example, inorganic materials, can be designed to work at high temperatures and hence can be used to concentrate the hot reducing gases. Examples of the reducing gas membranes include hollow fiber membranes, mixed conducting ceramic membranes, and palladium membranes.

As explained above, the sulfur-rich stream flowing in the sulfur-rich track 66 reacts in the sulfur recovery unit 18 to form or to get converted into a sulfur product, in accordance with one embodiment. The conversion can be accomplished in the sulfur recovery unit 18 through one or more catalytic reactions. Sulfur recovery unit 18 can be based on different sulfur recovery methods such as, for example, oxidizing to form sulfur, reacting with water or oxygen to form sulfuric acid, reacting with the other input feeds such as ammonia to form ammonium sulfate, or direct conversion to sulfur, as represented by Equation 6. Several other methods offered commercially can also be considered for using in the sulfur recovery unit 18.

In one embodiment, the sulfur-rich stream of the sulfur-rich track 66 and hydrogen rich reducing gas stream combine at a porous membrane device in the sulfur recovery unit 18 forming the elemental sulfur product. In one embodiment, the porous membrane device comprises a non-selective membrane allowing the passage of sulfur stream and hydrogen for efficient mixing. In another embodiment, the sulfur recovery unit 18 can be, for instance, a redox catalytic reactor. In some embodiments, multiple stages may be required to achieve the desired level of sulfur recovery. For example, multiple-stage, multiple-pass membrane configurations such as membrane modules arranged in serial or parallel cascading sequences or in a "Christmas tree" configuration can be used in the multiple stage sulfur recovery.

Depending on the sulfur oxide content of the sulfur-rich stream and the hydrogen content in the reducing gas track 68, the efficiency of sulfur recovery and type of the sulfur product formed will vary. In one embodiment, for an efficient recovery of elemental sulfur in the sulfur recovery unit 18, it is desirable to have a molecular concentration of hydrogen in the $H_2$ rich reducing gas stream in the reducing gas track at a level of at least 1.5 times the molecular concentration of sulfur oxide in the sulfur-rich stream at the time of encountering each other at the sulfur recovery unit 18. In another embodiment, the molecular ratio of the hydrogen to sulfur oxide entering the sulfur recovery unit is at least 2:1.

In one embodiment, to achieve required levels of sulfur oxide, such as sulfur dioxide, an oxidizer 80 can be employed to oxidize a fraction of the sulfur-rich stream before entering the sulfur recovery unit 18. Therefore, in one embodiment, a sulfur rich stream enters the oxidizer through a slip-stream track 82 of the sulfur-rich track 66, and gets oxidized to form sulfur dioxide ($SO_2$) and other oxidized forms of sulfur and flowed into a sulfur oxide track 84 to form a sulfur product such as, for example, sulfuric acid, in the sulfur recovery unit 18. In another embodiment, the sulfur oxide track 84 can be joined with the sulfur rich track 66 to ensure sufficient levels of sulfur oxides before entering to the sulfur recovery unit 18.

Figure 3:
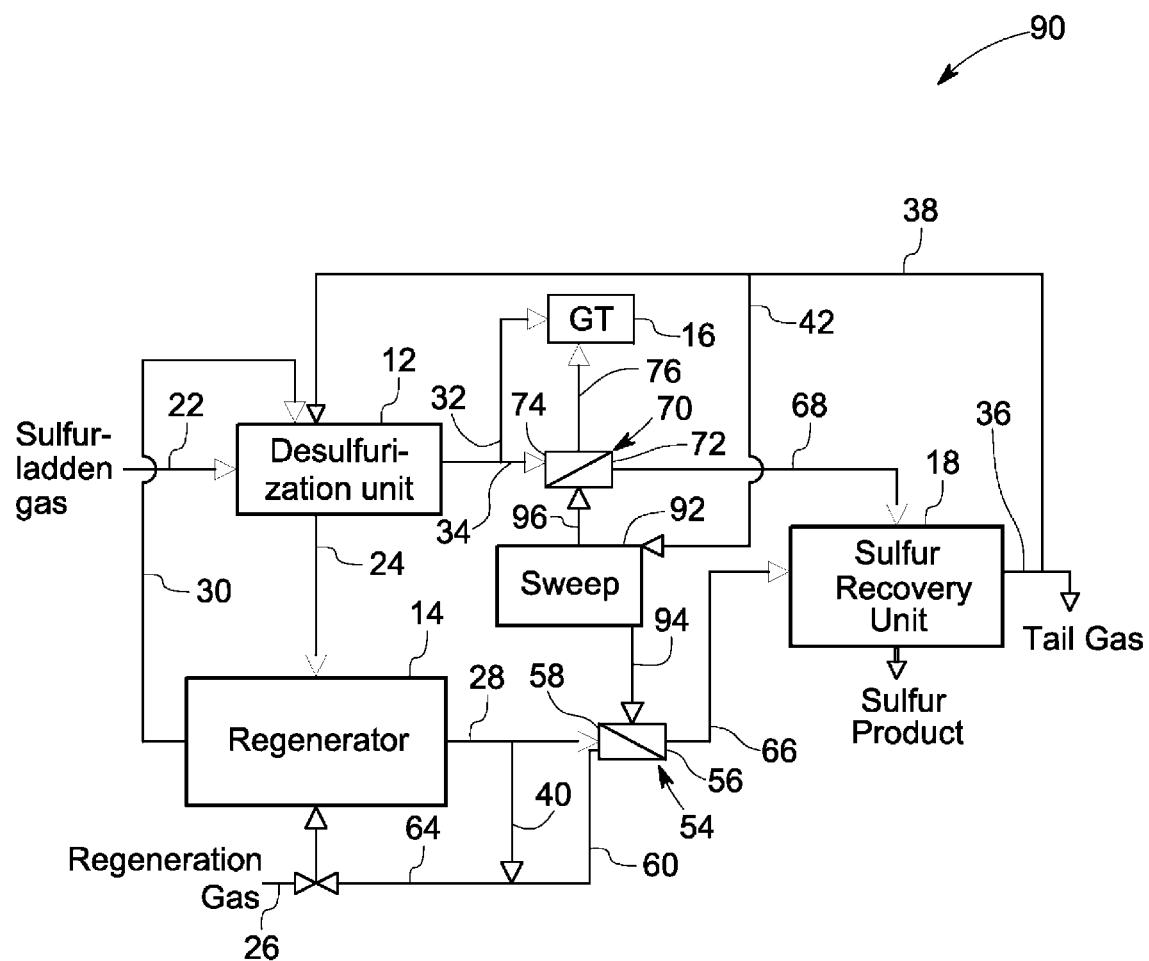
FIG. 3 is a schematic representation of a system for sulfur recovery from an oxidized sulfur stream in accordance with one embodiment of the invention.

FIG. 3. depicts a variation of the sulfur recovery system of FIG. 2 in a specific embodiment of the present invention. The sulfur recovery system 90 supports efficient sulfur recovery from the sulfur stream originated as a result of oxidative regeneration of the sulfurized mass by the input of air, oxygen, or oxygen rich air as the regenerator gas to the regenerator 14. The reaction of sulfurized mass with oxygen-rich regenerator gas forms an oxidized sulfur stream in the sulfur track 28. Therefore further oxidation of the sulfur stream through an oxidizer is not required to increase the efficiency of recovery of desired forms of sulfur products in the sulfur recovery unit 18. In one embodiment, the sulfur concentrator 54 used in the sulfur recovery system 90 includes a sulfur oxide concentrating membrane. Examples of such membranes include alumina or polyamide membranes in hollow fiber or spiral wound designs, respectively.

In one embodiment, a sweep stream from a sweep stream source 92 can be employed to sweep the sulfur rich stream in a sulfur concentrator 54 through a sulfur sweep track 94. In another embodiment, the sweep stream source 92 can be employed to sweep the reducing gas stream in a reductant concentrator 70 through a reductant sweep track 96. The sweep streams for the sulfur concentrator 54 and the reductant concentrator 70 can be individually employed independent of each other and can operate from the same source or from different sources. In one embodiment, the sweep stream comprises nitrogen gas, while in another embodiment the sweep stream comprises steam. In yet another embodiment, the tail gas from the sulfur recovery unit 18 can be used as a sweep stream. In one embodiment, the sweep stream source 92 is connected to the tail gas track 36 to source the sweep stream from at least a portion of the tail gas. In another embodiment, the sweep stream source is connected to the slip-stream tail gas track 38 through a sweep stream sourcing track 42 to source the sweep stream from the slip-stream tail gas track 38. The sweep streams can help in carrying away the sulfur rich stream from the sulfur concentrator 54 and/or the reducing gas stream from the reductant concentrator 70 so as to increase the efficiency of the sulfur concentrator 54 and/or the reductant concentrator 70.

Figure 4:
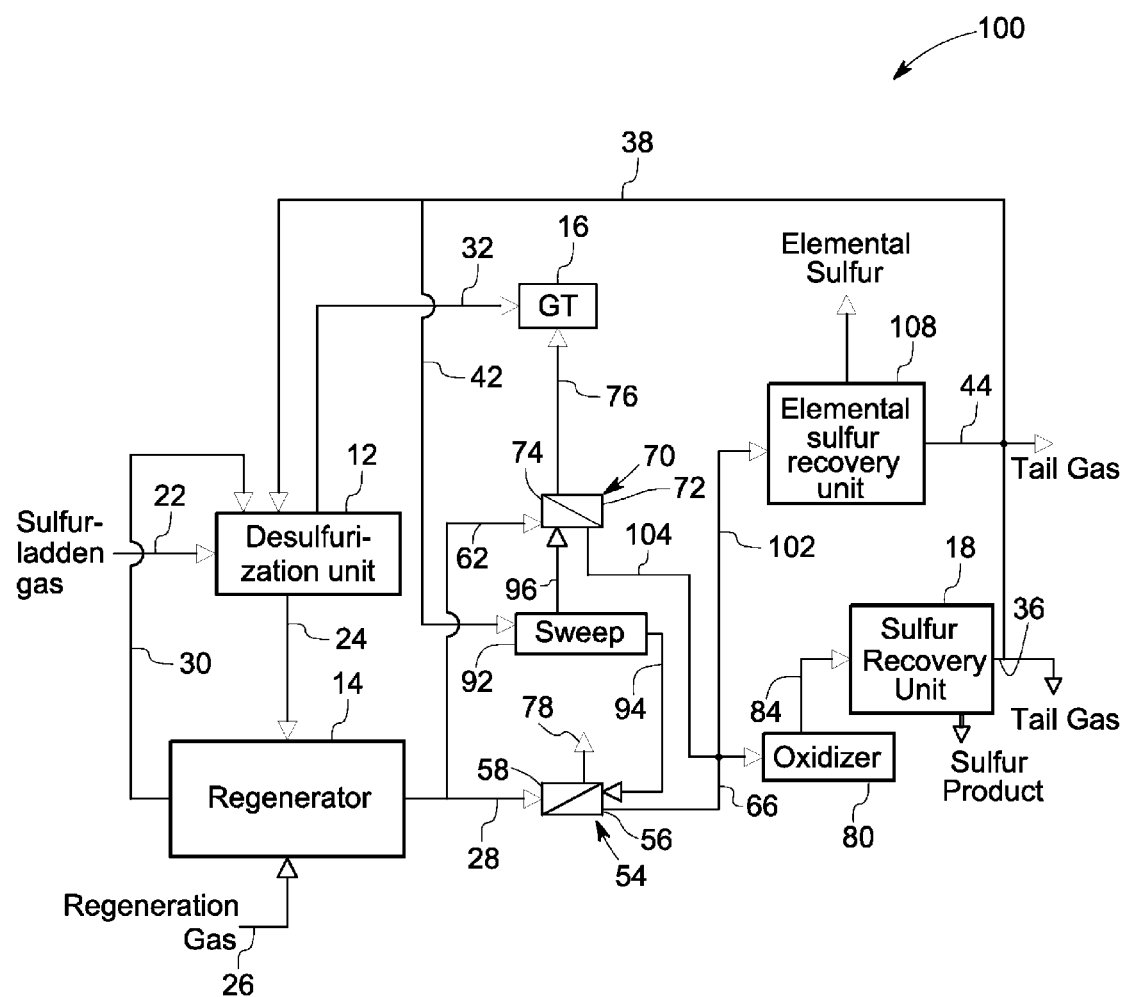
FIG. 4 is a schematic representation of a system for sulfur recovery from a reduced sulfur stream in accordance with one embodiment of the invention.

FIG. 4. depicts another variation of the sulfur recovery system of FIG. 2 where a reduced sulfur stream output of the regenerator 28 enters the sulfur track 28. The sulfur recovery system 100 of FIG. 4 supports efficient sulfur recovery from the sulfur stream originated as a result of lean-oxidative regeneration of the sulfurized mass in a specific embodiment of the present invention. A lean-oxidative regeneration can happen when the regenerator gas supplied to the regenerator 14 mainly comprises an inert gas or steam. For example, if the desulfurization unit 12 uses a tin oxide sorbent and regenerator 14 uses steam as a regeneration medium for regenerating tin oxide, then the regenerator 14 is likely to produce a hydrogen sulfide ($H_2S$) rich reduced sulfur stream in the sulfur track 28. Similarly if the desulfurization unit 12 uses a liquid absorbent medium such as amine or glycol aqueous solutions, then the regenerator 14 is likely to produce a hydrogen sulfide ($H_2S$) rich reduced sulfur stream in the sulfur track 28. The contents of the reduced sulfur stream can vary depending on the quantity and composition of the input regeneration gas. In one embodiment, the reduced sulfur stream includes hydrogen along with $H_2S$.

In one embodiment, a sulfur concentrator 54 comprising a $H_2S$ concentrating membrane can be employed in the sulfur track 28 to concentrate the $H_2S$ percentage in the first part 56 of the sulfur concentrator 54 and to form an $H_2S$ concentrated stream in the sulfur rich track 66. The concentrated $H_2S$ stream can be directly fed through an $H_2S$ gas track into a process of elemental sulfur recovery such as, for example, a Claus process, modified Claus process or a direct oxidation process in an elemental sulfur recovery unit 108. In another embodiment, an oxidizer 80 can be directly employed on the sulfur-rich track 66 to oxidize the $H_2S$ rich gas coming out of the sulfur concentrator 54, and can be fed through an oxidized sulfur gas track 84 into the sulfur recovery unit 18 to form the required sulfur products such as, for example, elemental sulfur, sulfuric acid, or ammonium sulfate as explained in the earlier paragraphs. In one embodiment the elemental sulfur recovery unit 108 and the sulfur recovery unit 18 can be simultaneously operated, thereby increasing the productivity and efficiency of the sulfur recovery. The tail gas coming out of the tail gas track 36 of the sulfur recovery unit 18 and/or the elemental sulfur recovery unit tail gas track 44 can be used to feed to the desulfurization unit 12 or to the sweep stream source 92 to further utilize the tail gases.

In one embodiment, a slip-stream can be taken from the sulfur track through a second slip-stream sulfur track 62 and passed through a reductant concentrator 70 as shown in the sulfur recovery system 100 of FIG. 4 instead of or along with the fuel gases coming out of the desulfurization unit 12. In one embodiment, the reductant concentrator 70 is a hydrogen concentrator. The hydrogen concentrator can use a hydrogen membrane to concentrate hydrogen in the first end 72 and concentrate the residual gases of the reducing gas at the second end 74. A sweep stream through a sweep track 96 can be employed to sweep the concentrated hydrogen from the first end and feed in to the gas turbine (GT) 16, and a residual track 104 can be employed to take out the residual gases of the reducing gas. The residual gases of the reducing gas, generally comprising less hydrogen than that was present in the second slip-stream sulfur track 62, can be fed into the sulfur rich track 66 to be advantageously employed for the further reactions in forming the sulfur products. For example, two or more sulfur products can be simultaneously obtained by adding the residual gas feed of the reducing gases to the sulfur rich track 66.

The system including the sulfur concentrators and, optionally, reducing gas concentrators and methods of using the concentrators explained in various embodiments in the earlier paragraphs result in a sulfur recovery system that is made more compact, efficient, versatile, and less costly to produce sulfur products including elemental sulfur. Further, by the use of sulfur concentrators to concentrate the sulfur contents of the sulfur stream, it may be possible to operate the regenerators at lower sulfur concentrations than under normal conditions and also over a wider range of processing conditions, thereby providing an opportunity for desulfurization by using liquid sorbents at the same time reducing secondary reactions forming undesired secondary products such as sulfates. The system and method used herein with the reductant concentrators may lower the amount of useful fuel gas used as a reductant to produce sulfur product, thus allowing more fuel gas available for power generation or $H_2$ production.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A system, comprising:
 a desulfurization unit;
 a regenerator to receive sulfurized mass from the desulfurization unit;
 a sulfur recovery unit;
 a sulfur track in fluid communication with the regenerator and the sulfur recovery unit; and
 a sulfur concentrator on the sulfur track.
2. The system of claim 1, wherein the sulfur concentrator comprises a sulfur concentrating membrane.
3. The system of claim 1, wherein the sulfur concentrator comprises a sulfur oxide concentrator.
4. The system of claim 1, wherein the sulfur concentrator comprises a hydrogen sulfide concentrator.

5. The system of claim 1, further comprising a reducing gas track.

6. The system of claim 5, wherein the reducing gas track is a slip-stream fuel track from the desulfurization unit.

7. The system of claim 6, further comprising a reductant concentrator on the slip-stream fuel track.

8. The system of claim 7, wherein the reductant concentrator comprises a reducing gas concentrating membrane.

9. The system of claim 7, wherein the system further comprises a sweep stream track connected to at least one of the sulfur concentrator and the reductant concentrator.

10. The system of claim 9, wherein the sweep stream track is a slip-stream track of tail gas from the sulfur recovery unit.

11. The system of claim 1, wherein the system further comprises an oxidizer on the sulfur track in between the sulfur concentrator and the sulfur recovery unit.

12. A system, comprising:
a desulfurization unit configured to receive a sulfur-laden gas stream and form sulfurized mass;
a regenerator to receive sulfurized mass from the desulfurization unit;
a sulfur recovery unit;
a sulfur track for transporting oxidized sulfur gas from the regenerator to the sulfur recovery unit;
a sulfur oxide concentrating membrane on the sulfur track, comprising a first part to collect concentrated sulfur oxide and a second part to collect residual gas of the sulfur concentrating membrane;
a slip-stream fuel track in fluid communication with the desulfurization unit and the sulfur recovery unit;
a hydrogen concentrating membrane, disposed on the slip-stream fuel track, comprising a first part to collect concentrated hydrogen and a second part to collect residual gas of the hydrogen concentrating membrane;
a sweep steam track connected to the first part of the sulfur oxide concentrating membrane and first part of the hydrogen concentrating membrane; wherein
the sulfur recovery unit is in fluid communication with the first part of the sulfur oxide concentrating membrane and the first part of the hydrogen concentrating membrane.

13. A system, comprising:
a desulfurization unit configured to receive a sulfur-laden gas stream and form sulfurized mass;
a regenerator to receive sulfurized mass from the desulfurization unit;
a sulfur recovery unit;
a sulfur track for transporting reduced sulfur gas from the regenerator to the sulfur recovery unit;
a hydrogen sulfide concentrating membrane on the sulfur track, comprising a first part to collect concentrated hydrogen sulfide and a second part to collect the residual gas from the hydrogen sulfide concentrating membrane;
a first slip-stream sulfur track transporting reduced sulfur gas from the sulfur track to a hydrogen concentrating membrane comprising a first part to collect concentrated hydrogen and a second part to collect residual gas of the hydrogen concentrating membrane;
an oxidizer on a second slip-stream of the sulfur track in fluid communication with the first part of the hydrogen sulfide concentrating membrane, and the sulfur recovery unit;
a sweep steam track connected to the first part of the hydrogen sulfide concentrating membrane and first part of the hydrogen concentrating membrane; wherein
the sulfur recovery unit is in fluid communication with the oxidizer.

14. A process, comprising the steps of:
removing sulfur compounds from a sulfur-laden gas stream using a sorbent in a desulfurization unit to form a sulfurized mass;
desorbing gas from the sulfurized mass in a regenerator to form a sulfur stream;
concentrating a sulfur content of the sulfur stream using a sulfur concentrator to form a concentrated sulfur stream; and
converting the concentrated sulfur stream to form a sulfur product in a sulfur recovery unit.

15. The process of claim 14, wherein the sulfur concentrator increases the concentration of sulfur oxide in the sulfur stream.

16. The process of claim 14, wherein the sulfur concentrator increases the concentration of hydrogen sulfide in the sulfur stream.

17. The process of claim 14, wherein the concentrated sulfur stream is at least partially oxidized and contacted with a reducing gas stream at the sulfur recovery unit to form the sulfur product.

18. The process of claim 17, wherein the reducing gas stream is sourced from a slip-stream of the desulfurization unit.

19. The process of claim 17, wherein a reductant concentrator increases reducing gas concentration of the reducing gas stream to form a concentrated reducing gas stream.

20. The process of claim 19, wherein the reductant concentrator comprises a reducing gas concentrating membrane.

21. The process of claim 17, wherein a molecular ratio of reducing gas of the reducing gas stream to oxides of sulfur of the concentrated sulfur stream is at least 1.5.

22. The process of claim 14, further comprising a sweep stream to sweep concentrated gas from at least one of the reductant concentrator and the sulfur concentrator.

23. The process of claim 22, wherein the sweep stream comprises a portion of a tail gas stream from the sulfur recovery unit.

* * * * *

UNITED STATES PATENT AND TRADEMARK OFFICE
CERTIFICATE OF CORRECTION

| | | |
|---|---|---|
| PATENT NO. | : 7,901,646 B2 | Page 1 of 1 |
| APPLICATION NO. | : 12/535740 | |
| DATED | : March 8, 2011 | |
| INVENTOR(S) | : Ayala et al. | |

It is certified that error appears in the above-identified patent and that said Letters Patent is hereby corrected as shown below:

On the Face Page, in Field (56), under "OTHER PUBLICATIONS", in Column 2, Line 18, delete "Divisiow" and insert -- Division --, therefor.

On the Face Page, in the Figure, delete "ladden" and insert -- laden --, therefor.

On Page 2, in Field (56), under "OTHER PUBLICATIONS", in Column 2, Line 4, delete "sulfer" and insert -- sulfur --, therefor.

In Fig. 1, Sheet 1 of 4, delete "ladden" and insert -- laden --, therefor.

In Fig. 2, Sheet 2 of 4, delete "ladden" and insert -- laden --, therefor.

In Fig. 3, Sheet 3 of 4, delete "ladden" and insert -- laden --, therefor.

In Fig. 4, Sheet 4 of 4, delete "ladden" and insert -- laden --, therefor.

In Column 2, Line 44, delete "steam" and insert -- stream --, therefor.

In Column 3, Line 1, delete "steam" and insert -- stream --, therefor.

In Column 11, Line 36, in Claim 12, delete "steam" and insert -- stream --, therefor.

In Column 12, Line 10, in Claim 13, delete "steam" and insert -- stream --, therefor.

Signed and Sealed this
Twenty-first Day of June, 2011

David J. Kappos
*Director of the United States Patent and Trademark Office*